UNITED STATES PATENT OFFICE.

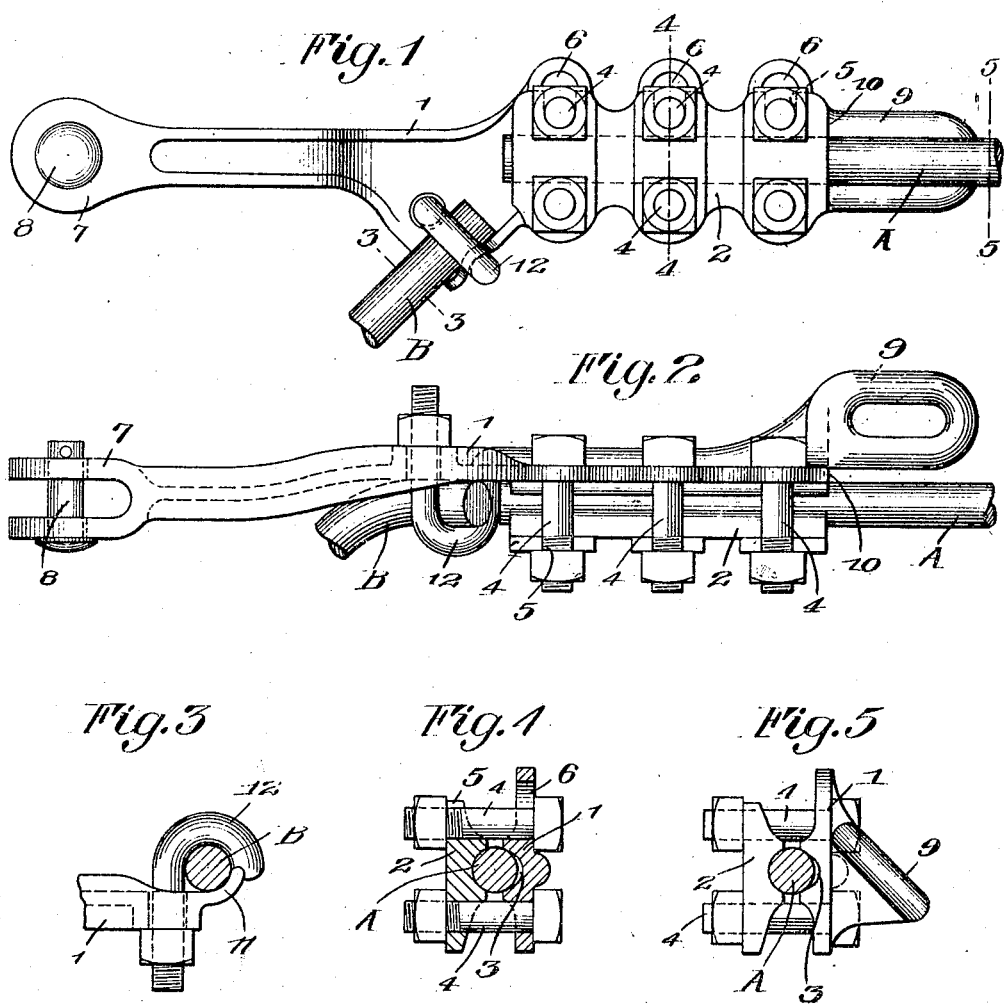

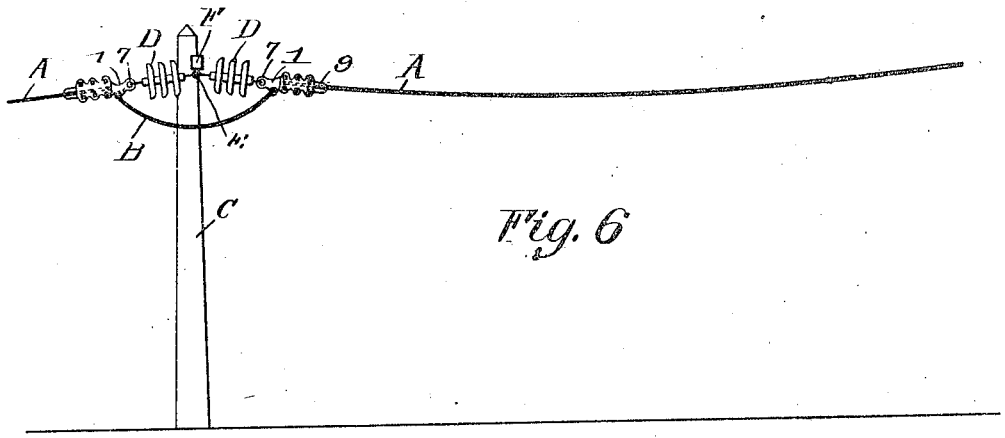
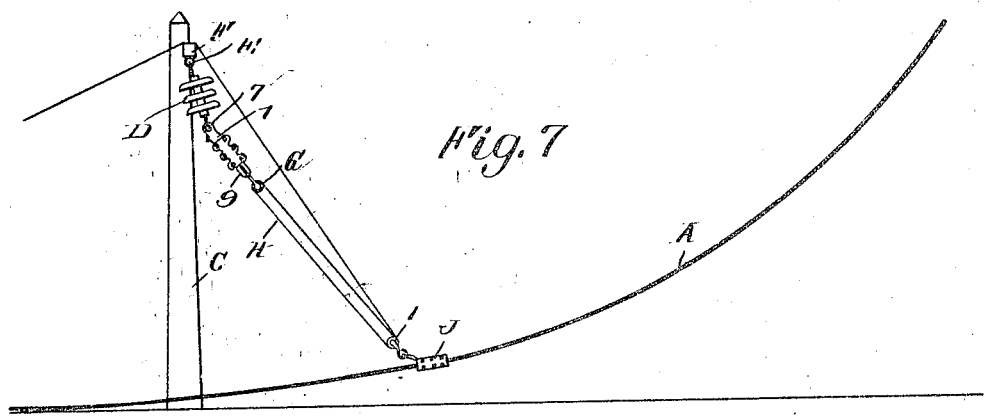
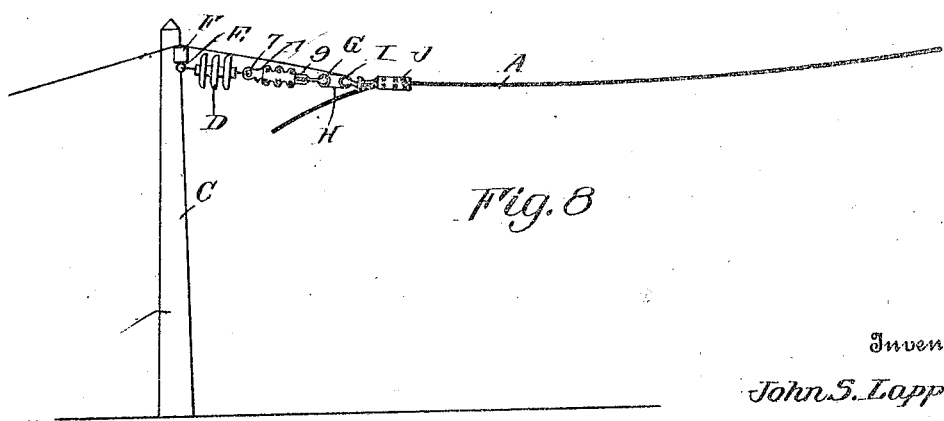

JOHN S. LAPP, OF VICTOR, NEW YORK, ASSIGNOR TO THE LOCKE INSULATOR MFG. CO., OF VICTOR, NEW YORK, A CORPORATION OF NEW YORK.

STRAIN-CLAMP FOR AERIAL CABLES.

1,268,981.  Specification of Letters Patent.  Patented June 11, 1918.

Application filed March 24, 1913. Serial No. 756,569.

*To all whom it may concern:*

Be it known that I, JOHN S. LAPP, of Victor, in the county of Ontario and State of New York, have invented certain new and useful Improvements in Strain-Clamps for Aerial Cables; and I do hereby declare the following to be a full, clear, and exact description of the same, reference being had to the accompanying drawings, forming a part of this specification, and to the reference-numerals marked thereon.

My present invention relates to the art of stringing aerial wires or cables, and more particularly the high potential cables of electrical transmission systems and it has for its object to provide a simple, strong and efficient strain clamp for joining the successive lengths of cable to the poles or other fixtures from which they are hung. A further object of the invention is to provide a clamp of this character that will lend itself to a mode of hoisting and fastening the cable whereby the catenary may be definitely predetermined and the cable cut to length and fastened while in the position in which it is to remain. To these and other ends the invention consists in certain improvements and combinations of parts all as will be hereinafter more fully described, the novel features being pointed out in the claims at the end of the specification.

In the drawings:

Figure 1 is a side elevation of a strain clamp constructed in accordance with and illustrating one embodiment of my invention;

Fig. 2 is a top plan view;

Figs. 3, 4 and 5 are sections taken substantially on the lines 3—3, 4—4 and 5—5, respectively, of Fig. 1, and Figs. 6, 7 and 8 are elevations illustrative of the mode of stringing a cable with the help of my improved strain clamp.

Similar reference numerals throughout the several figures indicate the same parts.

Referring first to Figs. 1 to 5, inclusive, the clamp preferably comprises a body piece or member 1 and a clamping plate 2, the inner or adjacent faces of which are recessed in the present instance or provided with longitudinal recesses or semi-circular grooves 3 constituting a seat within which the cable A may be received and clamped by the action of bolts 4 connecting the members. These bolts pass through relatively short open-ended slots 5 in the plate 2 and relatively long closed slots 6 in the body member so that by merely loosening the bolts and rocking or deflecting them in the long slots 6 they may be temporarily retracted from the open slots 5 to allow the passage of the cable laterally into or out of its seat between the members without detaching the bolts. The bolts are shown disposed in two rows on opposite sides of the seat 3 but, of course, it is only necessary to provide the elongated slots 6 for one set or row as the cable may be always inserted from that side.

At one end the body piece 1 is provided with a yoke 7 and pin 8 or other suitable means of attachment to receive and connect with the eye on the insulator bolt interposed between it and the cross arm or other supporting fixture while at the other or outer end it is provided with an eye 9 for hoisting purposes as will be hereinafter explained. This eye 9 preferably has its axis in a horizontal plane with both the seat 3 and the support connection or anchoring attachment 7; it preferably opens vertically and is offset from the natural position of the cable A as it leaves the end or lip 10 of the seat 3; it projects outwardly or longitudinally beyond the lip 10 and its plane is preferably inclined to the horizontal all for reasons that will hereinafter appear.

Preferably at the inner end of the seat 3 and of the clamping plate 2 is a clamping seat 11 (Fig. 3) for the end of a tie piece or section B of the cable which electrically connects adjacent sections A and which may be secured against its seat by a hook bolt 12 or otherwise.

Turning now to Figs. 6, 7 and 8, the former shows a conventional form of supporting pole or fixture C from which is suspended in finished position two cable sections A with the aid of two of my strain clamps indicated at 1. The clamps are connected at 7 to the insulators D which are in turn hung at E on the cross arm F so as to be interposed between the cable and its support while the tie piece B is strung between the clamps free of the support.

Of course the sag or catenary of the cable section A should, in each instance, be identical with that of adjacent sections determined by certain requirements of stress and in order to gage this it has hitherto been necessary, in most instances, to haul the continuous cable up over the cross arm F to the required degree; to mark off thereon the approximate point at which the strain clamp should be attached as nearly as possible; to lower the cable, cut it, and apply the clamp and then raise it again to position and connect up the clamp to its supporting member. This method, aside from the extra time and labor entailed in hoisting the cable more than once, is unsatisfactory owing to the fact that at the time the cable is in its trial position, it is only approximating its permanent position and a slight variation in what is estimated to be the proper location of the clamp may cause even this to vary.

With the use of my improved strain clamp, the cable is raised only once and then to a position that is not changed during the act of connecting it up through the medium of the clamp. To these ends, the insulator D is first hung from the cross arm F with the clamp 1 already fastened thereto at 7, as shown in Fig. 7. The upper block G of tackle H is hooked onto the eye 9 at the lower end of the clamp and the lower block I is attached by means of a suitable temporary clamp J to the continuous length of cable A at a point, roughly, beyond the point at which it is estimated that the strain clamp must be attached. The cable is then hoisted as shown in Fig. 8 to its exact position and it will be noted that as long as the weight thereof is already borne by the strain clamp and insulator D these parts will be straightened out to their normal positions as the tackle constitutes, in effect, a continuation of the cable and it is connected to the eye 9 which, as described, is in the horizontal plane with and very close to the seat 3 for the cable. Thereafter it is only necessary to cut the cable to suitable length short of the clamp J; fasten the free end in its seat in the strain clamp 1 and release the tackle by removing the temporary clamp J and by removing the hook of the block G from the eye 9 of the strain clamp, whereafter the cable will be in exactly the same position as the strain has simply been transferred from the eye 9 to the seat 3 and the only opportunities for variation lie in the difference in position of the eye and seat and the stretch of the short length of cable between the temporary clamp J and the lip 10 of the seat 3, both of which are negligible.

The eye 9 is offset and opens vertically in order to permit the ready disengagement of the hook on the block G of the hoisting tackle without interference on the part of the cable and the eye is inclined or tilted in order to bring its longitudinal axis and hence the line of strain as close as possible to the center of the cable.

I claim as my invention:

1. A strain clamp comprising an anchoring attachment, a cable seat in alinement therewith, means for clamping the cable in the seat and an eye adapted for the attachment of a cable hoisting device, said eye being offset laterally out of proximity to a cable clamped in the seat.

2. A strain clamp comprising an anchoring yoke having a transverse pin, a cable seat in alinement with the yoke and extending transversely of the pin, and an offset eye for the attachment of the cable hoisting device, the plane of the eye being inclined to that plane which is common to the pin and seat, for the purposes set forth.

3. A strain clamp comprising a body plate having an anchoring attachment at one end in alinement with one face of the plate, a cable clamping plate disposed against said face of the body plate, an offset eye projecting from the opposite face of the body plate and extending beyond the ends of both plates, and means for drawing the two plates together to clamp a cable between them.

4. In a strain clamp, the combination with two parts adapted to form a cable seat between them, one of said members being provided with a relatively short open slot and the other with a relatively long closed slot extending beyond the open slot, of a bolt for securing the parts together arranged to pass through both slots and to be displaced from the open one while rocked toward the far end of the closed one to permit the passage of the cable into and out of its seat.

JOHN S. LAPP.

Witnesses:
GEO. H. SCHOENTHALER,
R. V. BALDWIN.